United States Patent
Voorhees et al.

(10) Patent No.: US 11,148,022 B2
(45) Date of Patent: Oct. 19, 2021

(54) MOLDED GOLF FLAGSTICK AND METHOD FOR MAKING

(71) Applicant: Standard Golf Company, Cedar Falls, IA (US)

(72) Inventors: Peter Voorhees, Cedar Falls, IA (US); Terry L. Schoppe, Cedar Falls, IA (US); Jon Klapperick, Albert Lea, MN (US)

(73) Assignee: Standard Golf Company, Cedar Falls, IA (US)

( * ) Notice: Subject to any disclaimer, the term of this patent is extended or adjusted under 35 U.S.C. 154(b) by 0 days.

(21) Appl. No.: 16/253,076

(22) Filed: Jan. 21, 2019

(65) Prior Publication Data
US 2020/0230475 A1    Jul. 23, 2020

(51) Int. Cl.
*A63B 57/30*    (2015.01)

(52) U.S. Cl.
CPC ........ *A63B 57/357* (2015.10); *A63B 2209/00* (2013.01)

(58) Field of Classification Search
CPC .......................... A63B 57/357; A63B 2209/00
See application file for complete search history.

(56) References Cited

U.S. PATENT DOCUMENTS

| | | | |
|---|---|---|---|
| 8,777,768 B2 | 7/2014 | Schoppe et al. | |
| 2005/0272515 A1* | 12/2005 | Hurley | G09F 17/00 473/173 |
| 2008/0171608 A1* | 7/2008 | Priegel | A63B 57/357 473/176 |
| 2012/0028725 A1* | 2/2012 | Priegel | A63B 57/357 473/176 |
| 2012/0184387 A1* | 7/2012 | Schoppe | A63B 57/357 473/176 |

(Continued)

OTHER PUBLICATIONS

The Putt Saver Ferrule as shown in Standard's 1938 catalog discloses golf flagsticks made from a variety of materials that contain a lower portion consisting of raw steel fitted onto an upper portion made from a different material of a larger diameter.

(Continued)

*Primary Examiner* — Jeffrey S Vanderveen
(74) *Attorney, Agent, or Firm* — Nyemaster Goode, PC (57) ABSTRACT

A golf flagstick device comprising a rigid support member combined with a plurality of jacks. The components are encapsulated by a material, such as a thermoplastic or thermosetting polymer, using an injection molding process. The jacks have one or more arms extending outward from a center portion. The arms are adapted to contact the inner wall of the mold's cavity to help hold the rigid support member in one place and away from the inner wall during the molding process. The flagstick includes a ferrule attached to a lower end which is adapted for placement into a putting cup and a tip fitting attached to an upper end which is adapted to be combined with a flag. The ferrule and/or tip fitting may be combined with the rigid support member before the injection molding process resulting in the ferrule and/or tip fitting being at least partially filled with and/or encapsulated by the material to help hold the components together without requiring a secondary attachment operation.

23 Claims, 12 Drawing Sheets

(56) References Cited

U.S. PATENT DOCUMENTS

2016/0228754 A1* 8/2016 Jung .................. G09F 17/00
2018/0353819 A1* 12/2018 Debono ............... B32B 25/045
2019/0038946 A1* 2/2019 Gregory .............. A63B 57/357

OTHER PUBLICATIONS

A page from the 2018 Par Aide catalog discloses a flagstick with a lower portion made from fiberglass connected to an upper portion made from aluminum of a larger diameter.
A page from the 2018 Standard catalog discloses a Junior Tournament Practice Green Rod made from injection molded plastic.

* cited by examiner

MOLDED GOLF FLAGSTICK AND METHOD FOR MAKING

BACKGROUND

The game of golf uses flagsticks to mark the location of a hole on a putting green. Flagsticks typically range from 5 to 8 feet in length, and in one-half to three-quarters of an inch in diameter. Flagsticks have traditionally been made from rigid and sturdy materials such as wood, aluminum, and fiberglass. All of these materials are becoming increasingly more expensive and they require a varying degree of labor intensive secondary operations to produce and assemble the finished product. Further, flagsticks are exposed to a variety of conditions that can contribute to deterioration, including turf chemicals and fertilizers, ultra violet exposure, wind, rain and other weather elements, and vandalism and abuse.

Wooden flagsticks are vulnerable to rot, insect and rodent damage, and tend to warp when exposed to excessive moisture. Sunlight and moisture also causes deterioration to the finish. Aluminum flagsticks must be painted and are subject to chipping and pealing as a result of the elements and rough handling by golfers and maintenance crews. Once chipped, the aluminum substrate will deteriorate when exposed to corrosive golf course chemicals and fertilizers. Fiberglass flagsticks will deteriorate over time when exposed to the elements, golf course chemicals and rough handling. This results in not only a rough and dull appearance, but exposure of the fiberglass ends, which can cause injury to players and the grounds crew.

Injection molding is a manufacturing process used to make parts out of a composite or plastic material. Injection molding requires a relativity low amount of labor since the molded product requires few if any secondary operations, such as painting, grinding and machining. However, injection molding a product in the shape of a flagstick would presents some challenges. First, when molten plastic is injected into the mold, it is done so under high pressure. A molded part having the long length but small diameter of a flagstick will tend to warp and bend. In addition, most plastics are less rigid than wood, aluminum or fiberglass, so even if the part can be kept straight in the molding process, it will prove to be too flexible for its intended use and will not provide sufficient strength to prevent breakage under the conditions found on golf courses. There are highly engineered materials which can offer additional strength and rigidity, such as carbon fiber plastic, however these materials are quite expensive, require special handling in the molding process, and tend to produce parts with a dull or rough finish.

There is therefore a need for improved golf flagstick device and manufacturing method which overcomes these and other problems.

SUMMARY

One aspect of the invention relates to a golf flagstick device comprising a rigid support member combined with a plurality of jacks. The components are encapsulated by a material, such as a thermoplastic or thermosetting polymer, using an injection molding process. The jacks have one or more arms extending outward from a center portion. The arms are adapted to contact the inner wall of the mold's cavity to help hold the rigid support member in one place and away from the inner wall during the molding process. The flagstick includes a ferrule attached to a lower end which is adapted for placement into a putting cup. In one embodiment the ferrule may be combined with the rigid support member before the injection molding process resulting in the ferrule being at least partially filled with and/or encapsulated by the material to help hold the components together. The other (upper) end of the flagstick includes a tip fitting for attaching a flag. In one embodiment the tip fitting may be combined with the rigid support member before the injection molding process resulting in the tip fitting being at least partially filled with and/or encapsulated by the material to help hold the components together. The rigid support member core provides the necessary strength and rigidity, while the plastic material layer provides several features desired by the market, including a high gloss and weather resistant finish and less rebounding of the ball as it strikes the flagstick.

Another aspect of the invention relates to a method of making a golf flagstick device. The method includes combining a plurality of jacks with a rigid support member to create an assembly then placing the assembly into a flagstick shaped mold of an injection molding machine. The jacks have arms which extend outward from a center portion to contact the wall of the mold cavity. The jacks help immobilize the rigid support member and hold it away from the walls and near the center of the mold cavity. A molten material such as thermoplastic or thermosetting polymer is injected into the mold to encapsulate the support member and at least partially encapsulate the jacks. The material is allowed to cool and harden resulting in a golf flagstick device having a rigid support member encapsulated by a plastic material. The flagstick includes a ferrule attached to one end which is adapted for placement into a putting cup. The other end includes a tip fitting adapted for attachment to a flag.

Another aspect of the invention relates to a method of making a golf flagstick device in two separate sections then attaching the sections after both have been over molded in an injection molding process. Among other things, manufacturing the flagstick in two sections makes it easier to transport and ship since the two pieces can be combined after they reach the buyer's golf course. The method includes combining a plurality of jacks with a first rigid support member to create a first assembly and combining a plurality of jacks with a second rigid support member to create a second assembly. The first assembly is placed into a first mold of an injection molding machine to make the lower portion of the flagstick and the second assembly is placed into a second mold of an injection molding machine to make the upper portion of the flagstick. The jacks have arms which extend outward from a center portion. The arms contact the wall of each respective mold cavity to hold the support members away from the walls and near the center of the mold cavity. A molten material such as thermoplastic or thermosetting polymer is injected into each mold to encapsulate the support member and at least partially encapsulate the jacks. The material is allowed to cool and harden. The two flagstick sections may be shipped to their desired location then the upper portion of the flagstick is combined with the lower portion of the flagstick resulting in a golf flagstick device having a rigid support member encapsulated by a material extending through the upper portion and the lower. The flagstick includes a ferrule attached to one end which is adapted for placement into a putting cup. The other end includes a tip fitting for attachment to a flag.

In any of the methods and devices described above, the ferrule and/or the tip fitting may be combined with the flagstick as part of the injection molding process in order to avoid secondary operations to attach the ferrule and tip fitting to the flagstick. The ferrule includes a longitudinal channel or opening extending through the length of the ferrule. Part of the rigid support member is inserted at least partially into the opening before the injection molding process. A jack may also be inserted into the opening in the ferrule to help support the rigid support member near the center of the opening. The lower or distal end of the ferrule has an outer diameter smaller than an outer diameter of an upper end of the ferrule. A molten material such as thermoplastic or thermosetting polymer is injected into the mold to encapsulate the rigid support member and form the outer surface of the flagstick. The material molten passes through the opening in the ferrule and encapsulates the lower end of the ferrule having the smaller diameter. The larger diameter of the ferrule is not encapsulated because its diameter is large enough to contact the inner walls of the mold cavity. The tip fitting has an internal opening with a varied diameter. The opening is adapted to receive an upper portion of the rigid support member. Plastic is injected into the opening past a portion of the opening having a narrower diameter to a portion of the opening having a larger diameter. The narrower diameter portion is a rim or flange which prevents the hardened material in the larger diameter portion from passing through the narrower opening of the smaller diameter portion.

Another aspect of the invention includes an injection molding machine having a mold cavity with a plurality of retractable members such as pins adapted to support a rigid support member away from the walls of the mold. The retractable members have an extended position wherein they extend into the mold cavity to support the rigid support member and a retracted position wherein the pins retract into the walls of the cavity. The pins are positioned along the length of the cavity. The end point of the pins contact the rod and have a radius which is the reciprocal of the radius of the rod in order to hold the rod in place, and thus prevent the rod from moving on the plane perpendicular to the pins as the molten plastic is fed into the mold. In use, the retractable members are moved to their extended position and a rigid support member, such as a metal rod, is placed in the mold so that the retractable members hold the support member away from the wall of the mold when the mold is closed. A molten material, such as thermoplastic or thermosetting polymers, is injected into the mold to encapsulate the rigid support member. After the molten material has cooled and hardened, the retractable members are moved to their retracted position resulting in an injection molded product having a rigid support member encapsulated by the material.

DETAILED DESCRIPTION

Figure 1:
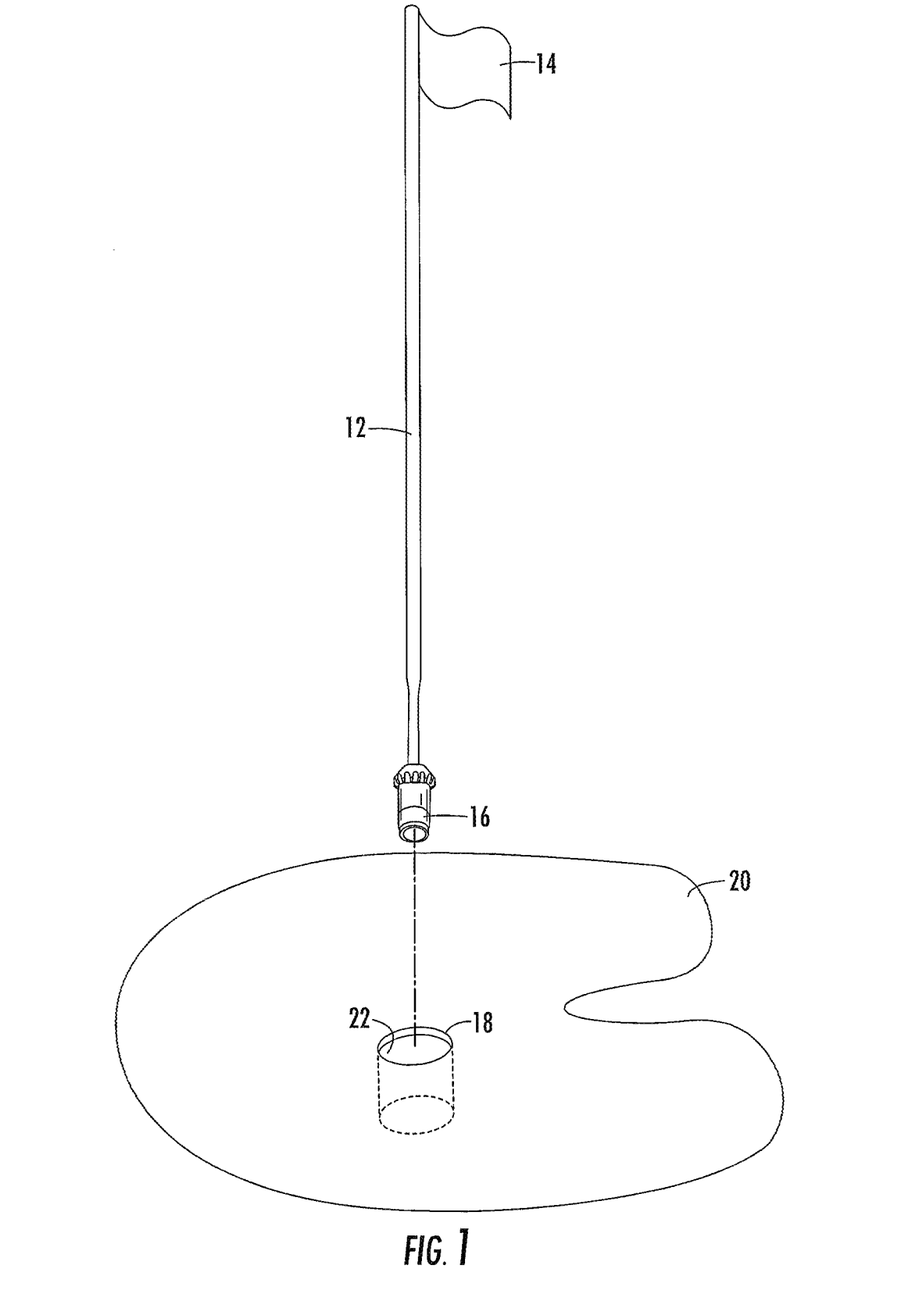
FIG. 1 is a perspective view of the golf flagstick assembly in position over a golf putting cup in a putting green.

FIG. 1 illustrates a flagstick assembly and a golf green 20. The flagstick assembly includes a flagstick body 12 having a flag 14 at a top end of the flagstick body 12 and a ferrule 16 at a lower end of the flagstick body 12. A hole 18 is provided in the green 20. A cup 22, which acts as a liner is provided within the hole 18. The flagstick assembly may be selectively placed within the cup 22 to serve as a marker and visual indicator of the location of the hole 18 for golfers.

Figure 2:
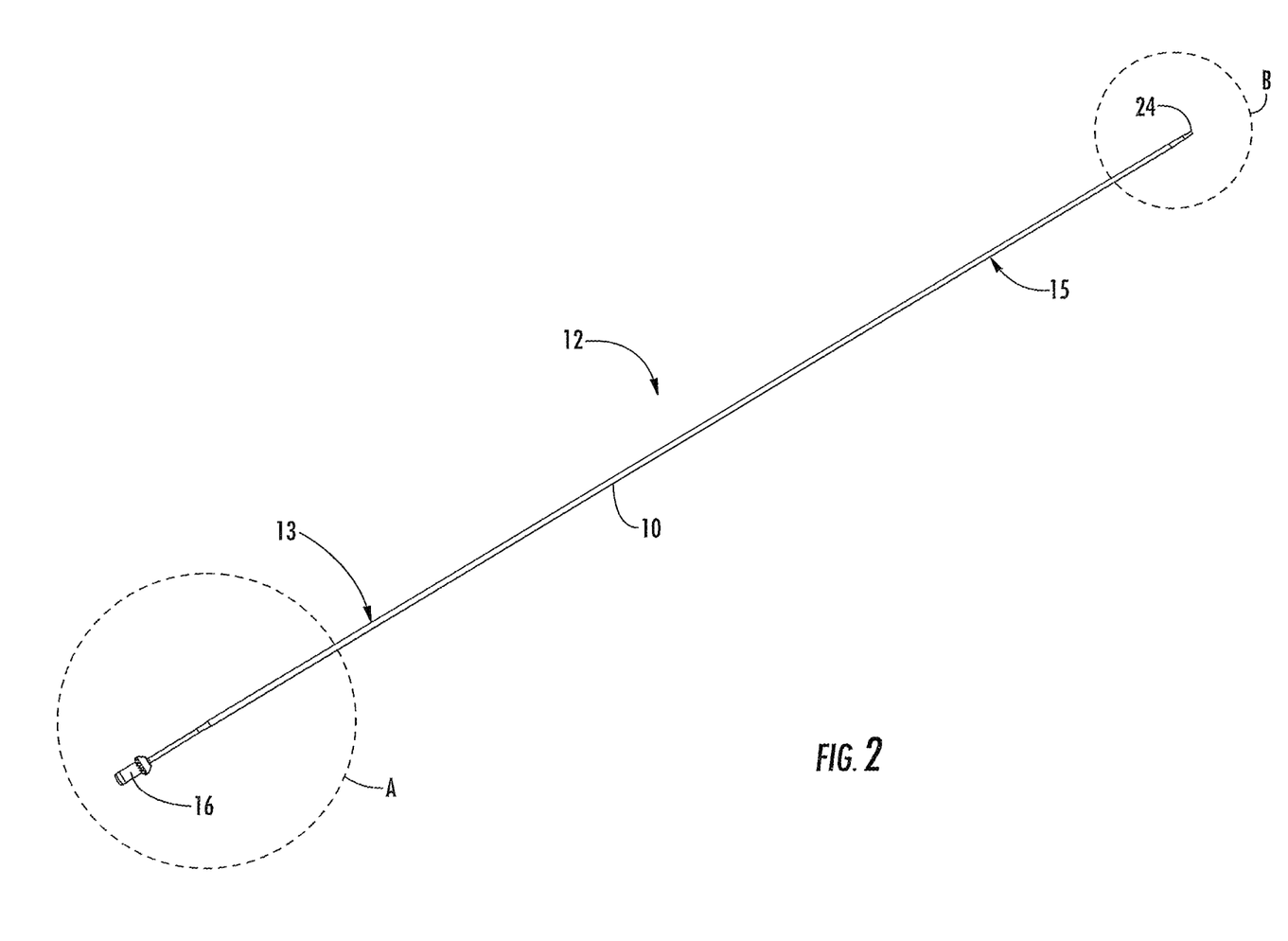
FIG. 2 is a side view of the golf flagstick assembly of FIG. 1.
Figure 3:
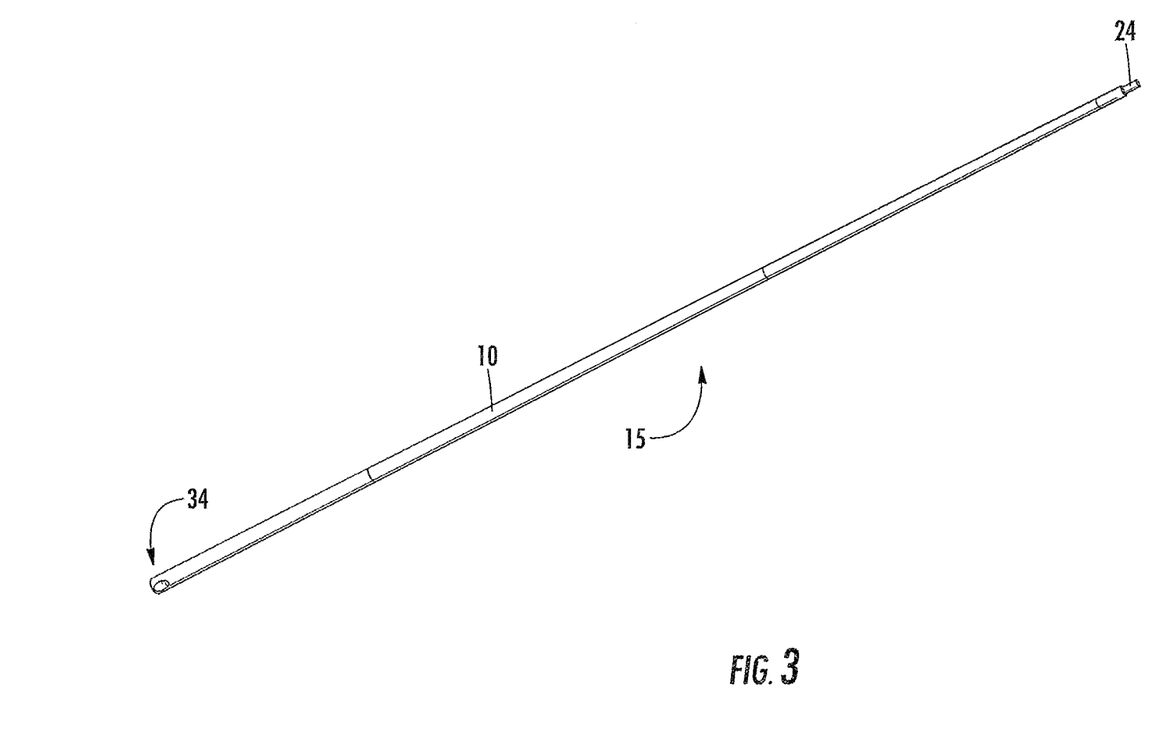
FIG. 3 is a side view of an upper flagstick section.
Figure 4:
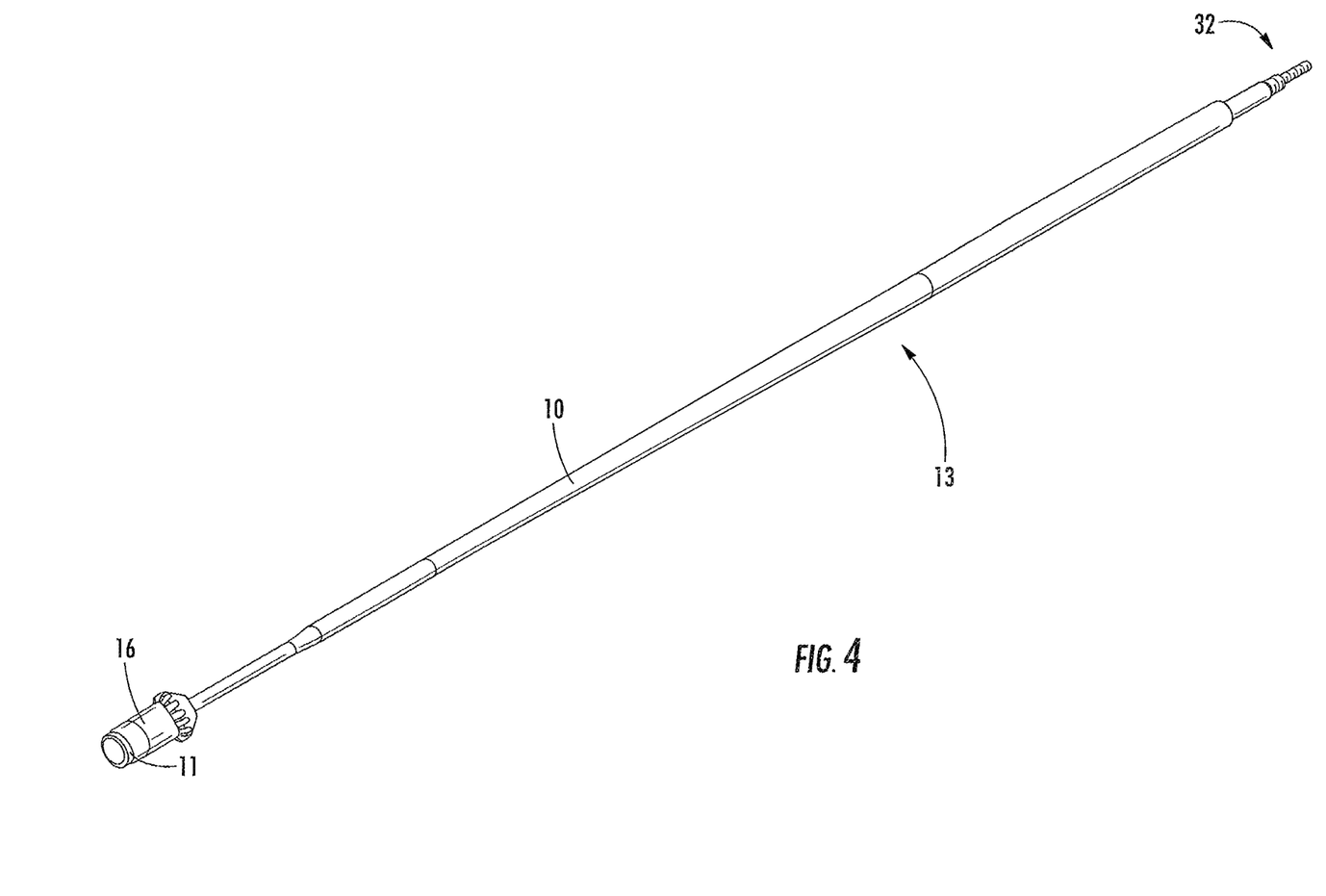
FIG. 4 is a side view of a lower flagstick section.

FIG. 2 shows the flagstick body 12. The flagstick body 12 has a lower portion 13 and an upper portion 15. In some embodiments the two portions 13, 15 are manufactured separately then combined later and in other embodiments the two portions 13, 15 are manufactured together to form one unitary flagstick 12. The outer surface of the flagstick body 12 is a material 10 such as a thermoplastic or thermosetting polymer which is injection molded over a rigid support member 26, as explained herein. FIG. 3 shows the upper portion 15 of the flagstick body 12 separated from the lower portion 13. The upper portion 15 has a tip fitting 24 adapted to combine with a flag 14. FIG. 4 shows the lower portion 13 of the flagstick body 12 has a ferrule 16 adapted for insertion into a putting cup 22. In embodiments where the two portions 13, 15 are manufactured separately, corresponding male and female threads 32, 34 may be molded into material 10 at the connecting ends of each portion 13, 15 of the flagstick 12 so that the portions 13, 15 can be combined after manufacture by screwing them together. In some embodiments the male threads 32 on the upper end of the lower portion 13 of the flagstick body 12 are part of a metal tip fitting that is similar to tip fitting 24 and combined with the lower portion 13 of the flagstick body 12 in the same manner as tip fitting 24 is combined with the upper portion 15 of the flagstick body 12 (shown in FIG. 9 and described herein in more detail). Other connecting means may also be used, including mechanical connecting means and friction fit connecting means.

Figure 5:
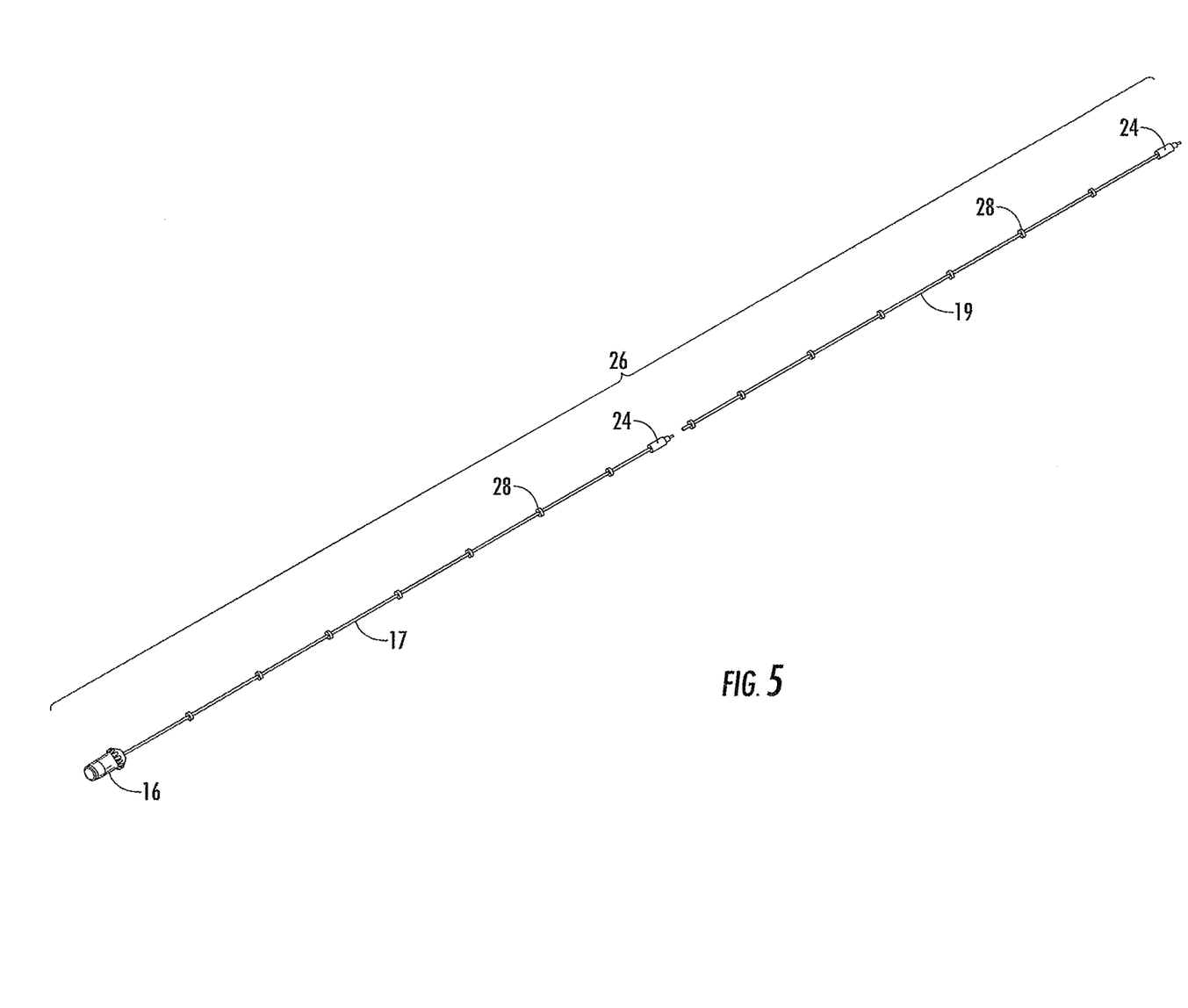
FIG. 5 is a side view of upper and lower rigid support members before they are encapsulated by the molten material.

FIG. 5 shows the rigid support member 26, which may be made from a metal such as steel. As explained in more detail below, the rigid support member 26 is encapsulated by the molten material 10 during the injection molding process. The rigid support member 26 adds strength and rigidity to the finished flagstick 12 device. In some embodiments, the rigid support member 26 includes a lower portion 17 and an upper portion 19. The two separate portions 17, 19 may be used in embodiments where the flagstick 12 has two portions 13, 15 injection molded separately, however, the two portions 17, 19 may be combined or used together in embodiments where the flagstick 12 is made in a single mold. In one embodiment the rigid support member 26 is combined with a plurality of jacks 28 along its length to form an assembly prior to insertion into the mold. Further, as described herein, the lower portion 17 may be combined with a ferrule 16 and the upper portion 19 may be combined with a tip fitting 24 prior to the injection molding process to secure those components to the flagstick 12 without requiring a secondary attachment operation.

Figure 6:
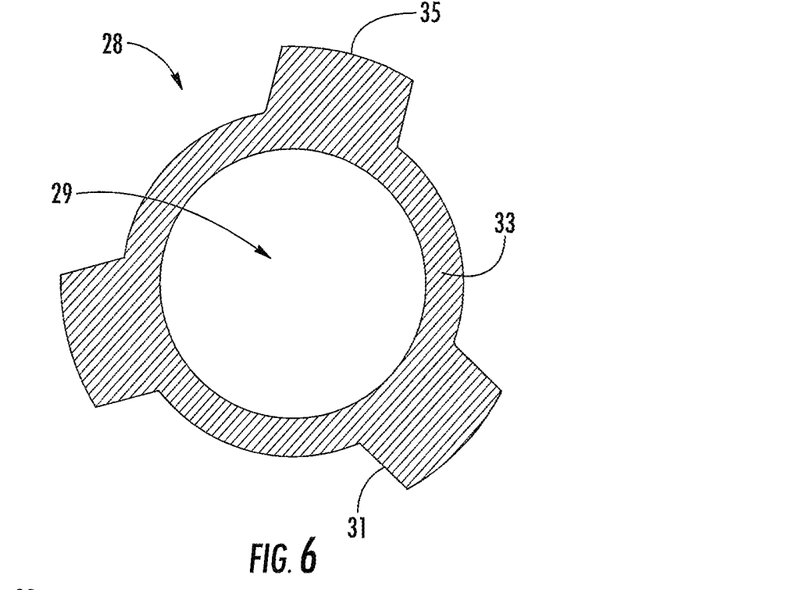
FIG. 6 is a top view of a jack.
Figure 6A:
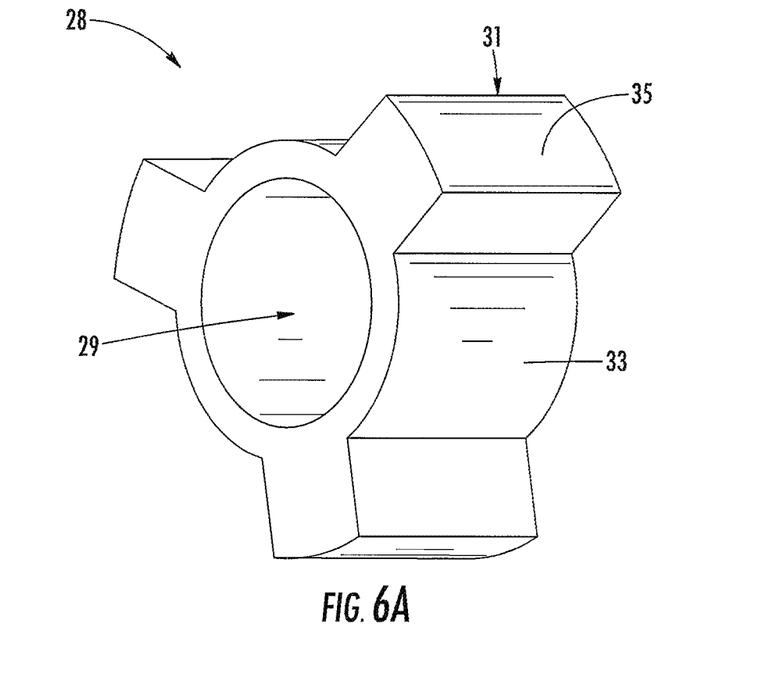
FIG. 6A is a perspective view of a jack.
Figure 6B:
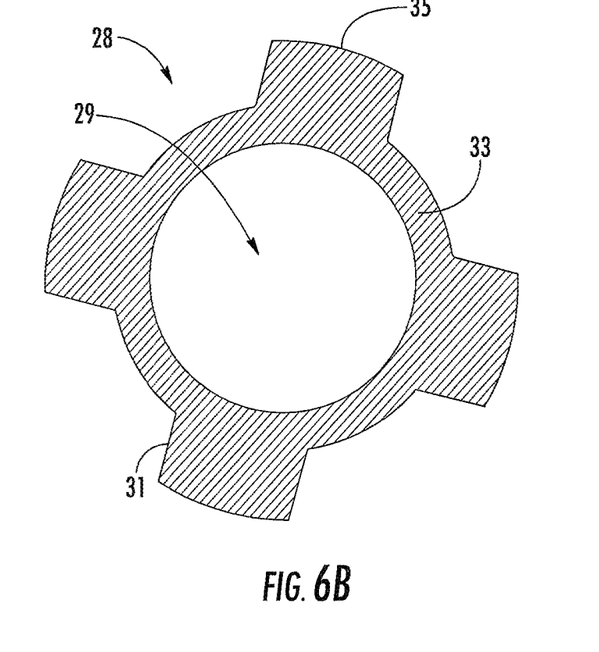
FIG. 6B is a top view of a jack similar to FIG. 6, but showing an embodiment where the jack has four arm members.

FIGS. 6, 6A, and 6B show an exemplary jack 28. As mentioned above, one or more jacks 28 are combined with the rigid support member 26 prior to the injection molding process to help immobilize the rigid support member 26 and hold it away from the walls of the mold during the injection molding process. The jacks 28 include an opening 29 adapted to receive the rigid support member 26. The jacks 28 may be manufactured separately then combined with the rigid support member 26 by inserting the rigid support member 26 through the opening 29. In other embodiments the jacks 28 may be integrally created as part of the rigid support member 26 by including the shape of the jacks 28 in the mold used to create the rigid support member 26. The jacks 28 have one or more arm members 31 extending outwardly from a main body portion 33. In one embodiment (FIGS. 6 and 6A) the jacks 28 have three arm members 31 extending radially outward from the center portion 33 a predetermined uniform distance. FIG. 6B shows an alternate embodiment wherein the jack 28 has four arm members 31. The ends 35 are adapted to contact the wall of the mold and hold the rigid support member 26 away from the wall and in one place as the molten material is injected into the mold under pressure. The ends 35 of the arm members 31 may be curved at the same radius of curvature as the inner wall of the mold so that the ends 35 contact the inner wall along their entire length. Further, having the same radius of curvature allows the ends 35 to become part of the outer surface of the flagstick 12. In other words, since the material 10 will generally not pass between the ends 35 of the jacks 28 and the inner wall of the mold during the injection molding process, the ends 35 become part of the outer surface of the flagstick 12 along with the cooled and hardened material 10.

Figure 7:
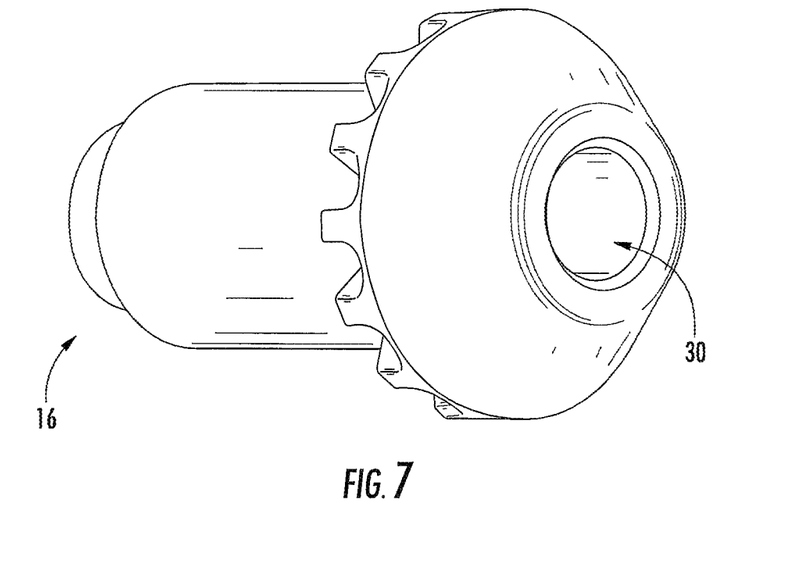
FIG. 7 is a perspective view of a ferrule before being combined with the flagstick.
Figure 8:
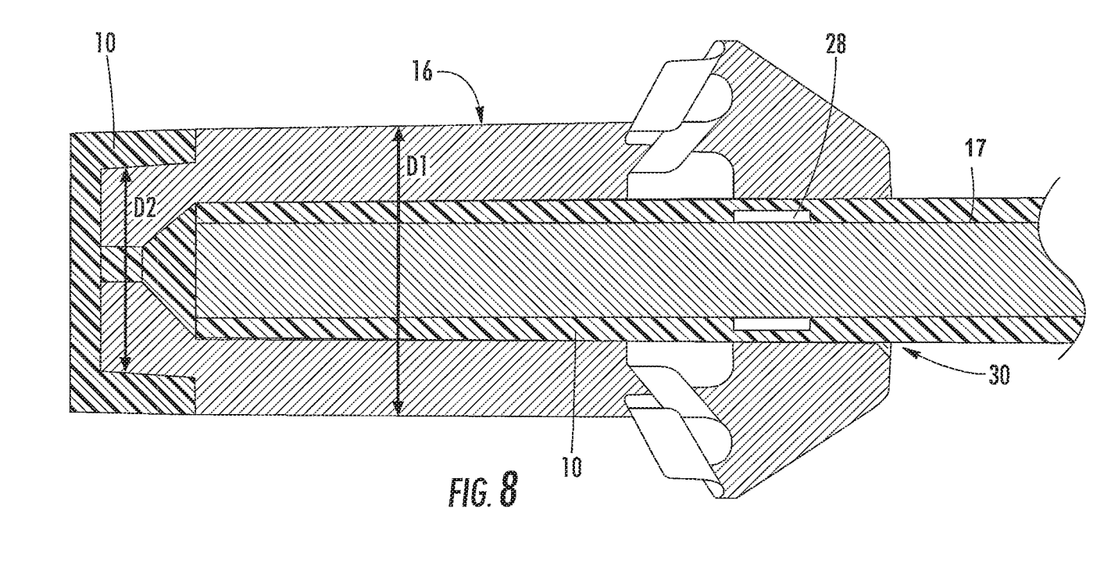
FIG. 8 is a section view of the ferrule shown in FIG. 7.

FIGS. 7 and 8 shows a ferrule 16 adapted to be combined with the lower portion 13 of the flagstick 12 for insertion into the cup 22. The ferrule 16 may be made from any suitable material, including a metal such as aluminum. The ferrule 16 includes a longitudinal opening 30 extending there through. As shown in FIG. 5, a portion of the rigid support member 26 is inserted into the opening 30 prior to the injection molding process. The opening 30 has a diameter larger than the diameter of the rigid support member 26 so that molten material 10 can pass through the opening 30 around the rigid support member 26. The opening 30 in the ferrule 16 would either be broached, contain one or more undercuts, and/or contain a means by which material 10 would be directed into an irregularity or blind cavity during the molding process, thus securing the ferrule 16 to the flagstick after the material 10 cools and hardens. As shown in FIG. 8, in one embodiment the molten material 10 passes through the opening 30 to secure the ferrule 16 to the flagstick 12 during the injection molding process. The ferrule 16 may include a first outer diameter D1 and a second outer diameter D2. The second outer diameter D2 is smaller than the first outer diameter D1 but not as small as the diameter of the opening 30. The second outer diameter D2 does not extend all the way to the walls of the mold which allows material 10 to fill in around the portion of the ferrule 16 having the second outer diameter D2. After the material 10 cools and hardens, it prevented from passing back through the narrower opening 30 which secures it to the flagstick 12. The portion of the ferrule 16 having the first diameter D1 may be large enough to contact the walls of the mold to prevent that portion from being encapsulated by material 10. The mold is fitted with one or more gates which allowed the material 10 to pass through the opening 30 and encapsulate the ferrule 16 around the second/smaller diameter D2 portion as shown best in FIG. 8. This provides a softer bottom for the ferrule 16 and helps secure the ferrule 16 to the flagstick 12.

Figure 9:
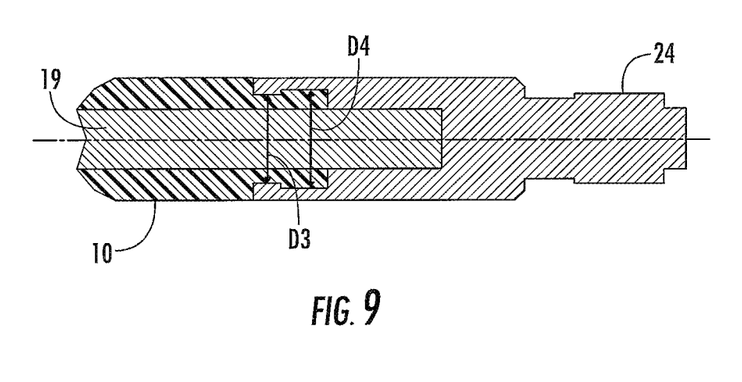
FIG. 9 is a section view of the flagstick taken from detail section B in FIG. 2.

FIG. 9 shows a tip fitting 24 adapted to be combined with the upper portion 15 of the flagstick 12 for attachment to a flag 14. The tip fitting 24 may be made from any suitable material, including a metal such as aluminum. The tip fitting 24 has a cavity or opening adapted to receive the upper portion 19 of the rigid support member 16. The opening in the tip fitting 24 would either be broached, contain one or more flanges or undercuts, and/or contain a means by which material 10 would be directed into an irregularity or blind cavity during the molding process, thus securing the ferrule to the flagstick. As shown in FIG. 9, the opening has a flange or undercut where the opening has a lower portion with a narrower diameter D3 than a diameter D4 of an upper portion. The material 10 is injection molded around the upper end 19 of the rigid support member 16 and into the opening in the tip fitting 24 so that the lower (narrower) diameter D3 of the tip fitting 24 helps secure the tip fitting 24 to the flagstick 12.

Figure 10:
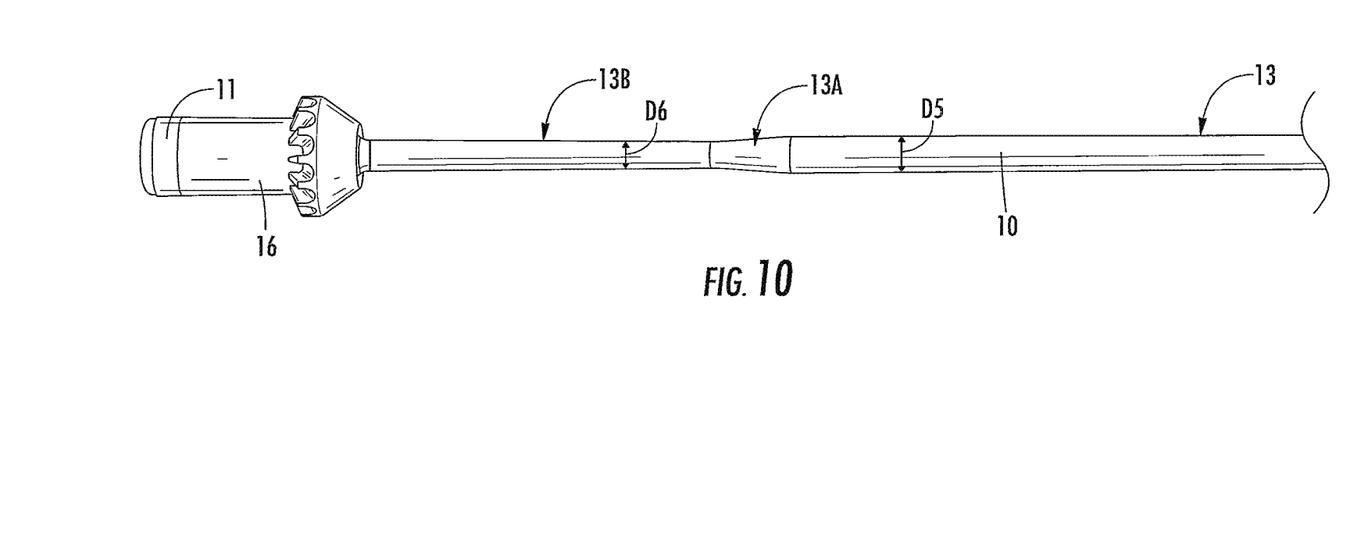
FIG. 10 is a detail view of the flagstick taken from detail section A in FIG. 2.

FIG. 10 shows an embodiment wherein the lower portion 13 of the flagstick 12 has a tapered section 13A near the ferrule 16. The flagstick has a first diameter D5 above the tapered section 13A and a second diameter D6 below the tapered section 13A. The first diameter D5 is larger than the second diameter D6 so that the tapered section 13A provides a generally downward angle when the flagstick 12 is secured in the cup 22. The second (smaller) diameter D6 remains generally constant as it extends from the tapered section 13A to the ferrule 16. In use, the tapered section 13A is positioned above the ferrule 16 so that the tapered section 13A is generally level with the ground surface when the flagstick 12 is in the cup 22. In this manner, golf balls that strike the tapered section 13A while the flagstick 12 is in the cup 22 will deflect downward from the tapered section 13A into the cup 22.

In use, the method of manufacturing the flagstick 12 device includes combining a plurality of jacks 28 with a rigid support member 26 to create an assembly. In some embodiments the rigid support member 26 includes two sections 17, 19 and the jacks 28 are combined with the first rigid support section 17 to create a first assembly and a second rigid support section 19 to create a second assembly. The first assembly is placed into a first mold of an injection molding machine to make the lower portion of the flagstick and the second assembly is placed into a second mold of an injection molding machine to make the upper portion of the flagstick. In an alternate embodiment the entire rigid support member 26 may be placed in a single mold to make the entire flagstick 12 as a single unit. The jacks 28 have arms 31 which extend outward from a center portion 33. The arms 31 contact the wall of the mold to hold the support members 28 away from the walls and near the center of the mold cavity. A molten material 11 such as thermoplastic or thermosetting polymer is injected into each mold to encapsulate the support member 26 and at least partially encapsulate the jacks 28. The material 11 is allowed to cool and harden. In embodiments where the flagstick 12 is manufactured in two sections, the two sections 13, 15 may be shipped to their desired location prior to assembly, then the upper portion 15 of the flagstick is combined with the lower portion 13 of the flagstick resulting in a golf flagstick device 12 having a rigid support member 26 extending through the upper portion and the lower encapsulated by a material 11. Corresponding male and female threads 32, 34 may be molded into the connecting ends of each portion 13, 15 of the flagstick 12 so that the portions 13,15 can be combined by screwing them together. The flagstick 12 includes a ferrule 16 attached to one end which is adapted for placement into a putting cup 22. The other end includes a tip fitting 24 for attachment to a flag 14. In some embodiments the ferrule 16 and/or the tip fitting 24 have an opening which is either broached, contains one or more flanges or undercuts, and/or contains a means by which material 10 would be directed into an irregularity or blind cavity during the molding process. After the material cools and hardens the ferrule 16 and/or tip fitting 24 is thereby secured to the flagstick without requiring any secondary attachment operation.

Figure 11:
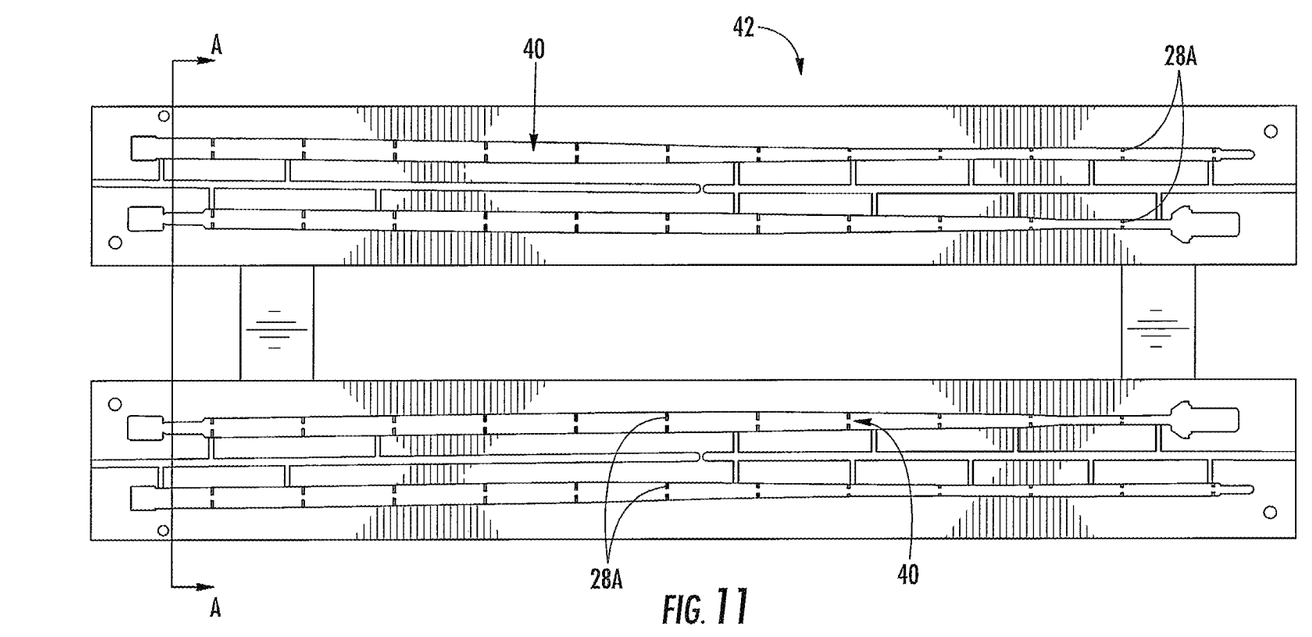
FIG. 11 an embodiment of the mold.
Figure 12:
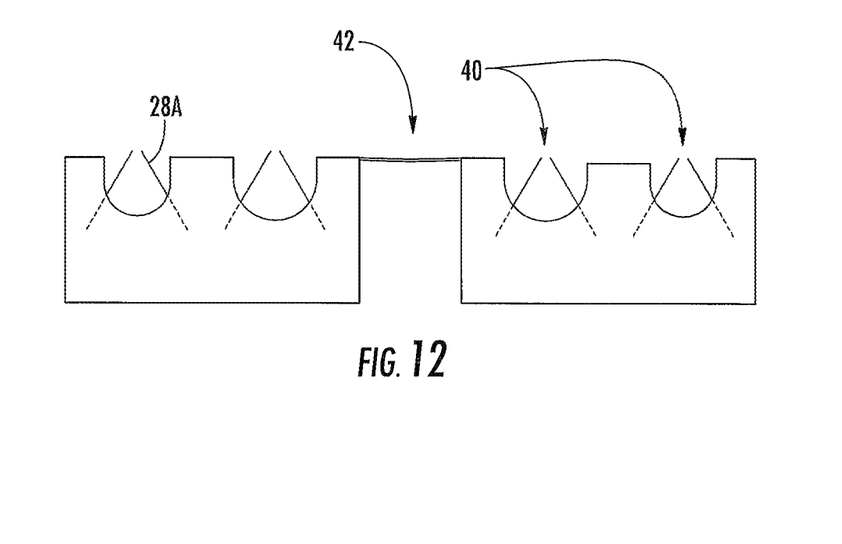
FIG. 12 is a section view of the mold taking along line A-A.
Figure 13:
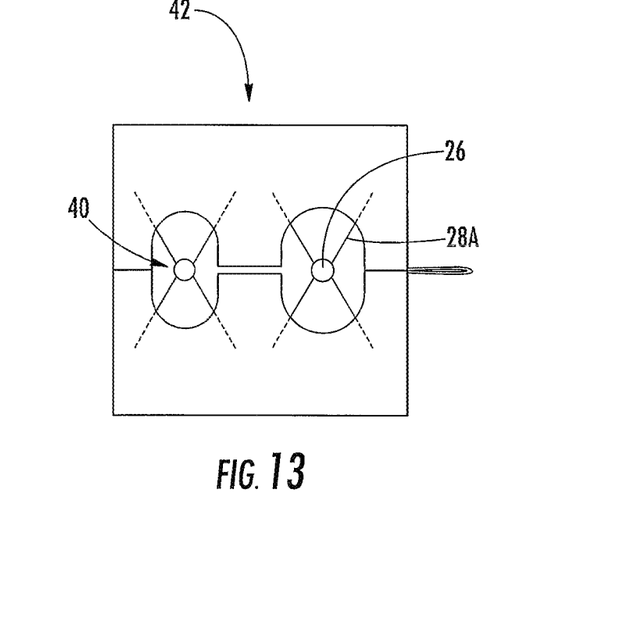
FIG. 13 is a section view similar to FIG. 12 but showing the mold in the closed position with a rigid support member positioned on the extended pins.

FIGS. 11-13 show another embodiment which includes an injection molding machine having a plurality of retractable members 28A such as pins adapted to support a rigid support member 26 away from the walls of the mold housing 42, similar to the function of the jacks 28 used in the embodiments described above. The mold housing 42 has a mold cavity 40 therein in the shape of a flagstick 12. As mentioned above, the flagstick 12 can be made as one continuous piece or it can be made in two portions 13, 15 as shown in FIG. 11. FIGS. 11 and 12 show the mold housing 42 has two halves. One of the halves pivots to enclose the mold cavity 40 as shown in FIG. 13. The retractable members 28A have an extended position wherein they extend into the mold cavity 40 to support the rigid support member 26 and a retracted position wherein the retractable members 28A retract into the walls of the cavity 40. The extended position of the retractable members 28A is shown by the solid lines and the retracted position is shown by the dashed linen. The retractable members 28A are positioned along the length of the cavity 40. The end point of the retractable members 28A which contacts the rigid support member 26 must have ends that contain a radius that is the reciprocal of the radius of the rigid support member 26 in order to hold the rigid support member 26 in place, and thus prevent the rigid support member 26 from moving on the plane perpendicular to the retractable members 28A as the molten plastic 10 is fed into the mold cavity 40. In use, the retractable members 28A are moved to their extended position (FIG. 12) and a rigid support member 26, such as a metal rod, is placed in the mold cavity 40 so that the retractable members 28A hold the support member 26 away from the wall of the mold cavity 40 when the mold housing 42 is closed (FIG. 13). A molten material 10, such as thermoplastic or thermosetting polymers, is injected into the mold housing 42 to encapsulate the rigid support member 46. After the molten material 10 has cooled and hardened, the retractable members 28A are moved to their retracted position behind the inner wall of the mold cavity 40 resulting in an injection molded product having a rigid support member 26 encapsulated by the material 10.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

The invention claimed is:
1. A golf flagstick having an upper portion and a lower portion, the golf flagstick comprising:

a support member having a length extending from the upper portion to the lower portion;
a plurality of jacks combined with the support member, the plurality of jacks spaced apart along the length of the support member so that at least one of the plurality of jacks is combined with the support member at the upper portion and at least one of the plurality of jacks is combined with the support member at the lower portion, wherein each of the plurality of jacks includes arm members extending outwardly from a main body portion; and
an injection molding material encapsulating the support member along its length and at least partially encapsulating the plurality of jacks, the injection molding material forming an outer surface.

2. The golf flagstick of claim 1 further comprising a ferrule combined with an end of the support member, wherein the ferrule is adapted to be inserted into a putting cup.

3. The golf flagstick of claim 1 further comprising a tip fitting combined with the support member, wherein the tip fitting is adapted to be combined with a flag.

4. The golf flags tick of claim 1 wherein each of the plurality of jacks includes an opening which receives a portion of the support member.

5. The golf flags tick of claim 1 wherein the injected molding material is one of a thermoplastic or thermosetting polymer.

6. The golf flags tick of claim 1 wherein the jacks further include ends having a radius of curvature generally the same as a radius of curvature of the outer surface.

7. The golf flagstick of claim 1 wherein the upper portion and the lower portion are configured to be selectively secured together.

8. The golf flagstick of claim 1 wherein the support member is completely encapsulated within the injection molding material.

9. The golf flags tick of claim 2 wherein the ferrule includes a longitudinal opening adapted to receive the support member, said ferrule having an upper portion with a first outer diameter, and a lower portion with a second outer diameter, and wherein second outer diameter is smaller than the first outer diameter and the lower portion is encapsulated by the material.

10. The golf flagstick of claim 2 wherein the outer surface includes an first diameter and a second portion with a second diameter, wherein the first portion and the second portion are connected by a tapered portion, and wherein the second diameter of the second portion remains generally constant from the tapered portion to the ferrule.

11. The golf flags tick of claim 3 wherein the tip fitting includes an opening adapted to receive the support member, said tip fitting opening having an upper portion with a first internal diameter and a lower portion with a second internal diameter, and wherein the second internal diameter is smaller than the first internal diameter and the opening partially filled with the material.

12. A golf flagstick comprising:
an upper portion having a first support member and a lower portion having a second support member;
a first plurality of jacks disposed on the first support member, the first plurality of jacks spaced apart along the length of the first support member;
a second plurality of jacks disposed on the second support member, the second plurality of jacks spaced apart along the length of the second support member;

a ferrule disposed at an end portion of the second support member, wherein the ferrule is configured to be inserted into a patting cup;

an injection molding material forming an outer surface of the flagstick, wherein the injection molding material encapsulates the first support member, the second support member, and at least partially encapsulates the first plurality of jacks and the second plurality of jacks.

13. The golf flagstick of claim 12, wherein the first support member is integrally formed with the first plurality of jacks and the second support member is integrally formed with the second plurality of jacks.

14. The golf flagstick of claim 12, wherein the ferrule comprises a through hole disposed such that the through hole surrounds a portion of the second support member.

15. The golf flagstick of claim 12 wherein the upper portion and the lower portion are configured to be selectively secured together.

16. The golf flags tick of claim 12 wherein the injection molding material encapsulates a portion of the ferrule to secure the ferrule to the second support member.

17. The golf flagstick of claim 14, wherein the material is disposed between the through hole and the portion of the second support member, thereby securing the ferrule to the second support member.

18. A golf flagstick comprising:
an upper portion having a first support member and a first plurality of jacks disposed on the first support member, the first plurality of jacks spaced apart along a length of the first support member;
a lower portion having a second support member and a second plurality of jacks disposed on the second support member, the second plurality of jacks spaced apart along a length of the second support member;
wherein the upper portion and the lower portion are configured to be selectively secured together;
a ferrule disposed at an end portion of the second support member, wherein the ferrule is configured to be inserted into a putting cup;
an injection molding material forming an outer surface of the flagstick, wherein the injection molding material at least partially encapsulates the first support member, the second support member, the first plurality of jacks, and the second plurality of jacks.

19. The golf flags tick of claim 18 wherein the injection molding material encapsulates a portion of the ferrule to secure the ferrule to the second support member.

20. The golf flagstick of claim 18 wherein the first plurality of jacks includes an opening which receives a portion of the first support member and the second plurality of jacks includes an opening which receives a portion of the second support member.

21. The golf flagstick of claim 18 wherein the first support member is integrally formed with the first plurality of jacks are the second support member is integrally formed with the second plurality of jacks.

22. A golf flags tick comprising:
an elongated flagstick body having an upper portion and a lower portion;
a support member encapsulated within the elongated flagstick body and configured to help strengthen the elongated flagstick body, the support member having a length extending from the upper portion to the lower portion;
a plurality of jacks combined with the support member and at least partially encapsulated within the elongated flagstick body, the plurality of jacks spaced apart along the length of the support member so that at least one of the plurality of jacks is combined with the support member at the upper portion and at least one of the plurality of jacks is combined with the support member at the lower portion, wherein each of the plurality of jacks includes arm members extending outwardly from a main body portion.

23. The golf flags tick of claim 22 wherein the support member is completely encapsulated within the injection molding material.

* * * * *